United States Patent [19]

Murphy et al.

[11] Patent Number: 4,946,939

[45] Date of Patent: Aug. 7, 1990

[54] HIGH PURITY POLYETHER POLYOLS

[75] Inventors: Frank H. Murphy, Alvin; Robert T. Jernigan, Lake Jackson; Jeff G. Grierson, Angleton; Wayne G. Wessels, Clute, all of Tex.

[73] Assignee: The Dow Chemical Company, Midland, Mich.

[21] Appl. No.: 359,014

[22] Filed: May 30, 1989

[51] Int. Cl.$^5$ ................... C08G 65/30; B01D 13/00
[52] U.S. Cl. ................... 528/421; 528/499; 568/621; 210/644; 210/651
[58] Field of Search ............ 528/421, 499; 568/621; 210/644, 651

[56] References Cited

U.S. PATENT DOCUMENTS

| | | | |
|---|---|---|---|
| 3,245,884 | 4/1966 | Kraut | 568/621 X |
| 3,326,875 | 6/1967 | Moore | 568/621 X |
| 3,461,169 | 8/1969 | Davis et al. | 568/621 X |
| 3,526,588 | 9/1970 | Michaels | 210/651 X |
| 3,766,165 | 10/1973 | Rennhard | 260/209 R |
| 3,876,794 | 3/1974 | Rennhard | 426/152 |
| 4,048,271 | 9/1977 | Kesting | 264/41 |
| 4,143,072 | 3/1979 | Metzel et al. | 568/621 X |
| 4,240,914 | 12/1980 | Iwama et al. | 210/500.2 |
| 4,332,686 | 6/1982 | Gerlach et al. | 210/651 |
| 4,384,047 | 5/1983 | Bensinger et al. | 521/64 |
| 4,618,534 | 10/1986 | Iwama et al. | 428/316.6 |
| 4,650,909 | 3/1987 | Yoakum | 568/621 |
| 4,752,363 | 6/1988 | Buckley et al. | 204/98 |

OTHER PUBLICATIONS

P. R. Klinkowski, "Ultrafiltration", Encyclopedia of Chemical Technology, Third Edition, vol. 23, pp. 439–461.

P. K. Eriksson, "Nanofiltration-What It Is and Its Applications", Paper presented at the Technology Planning Conference, Cambridge, Mass. (11-1-88).

P. K. Eriksson, "Nanofiltration Extends the Range of Membrane Filtration", Environmental Progress, vol. 7, No. 1, pp. 58–62.

L. E. Applegate, "Membrane Separation Processes", Chemical Engineering, Jun. 11, 1984, summarizes the known technology of membrane technology.

Primary Examiner—Earl Nielsen

[57] ABSTRACT

High purity polyether polyol compositions such as polyethylene glycol are made having small amounts of impurities such as oligomers of active hydrogen compounds with alkylene oxides. The high purity is achieved by subjecting the polyether polyol compositions to membrane filtration to get less than about 10 parts per million of the low molecular weight oligomers.

26 Claims, No Drawings

HIGH PURITY POLYETHER POLYOLS

BACKGROUND OF THE INVENTION

The present invention concerns high purity polyether polyol compositions and preferably, polyethylene glycol compositions which are useful to provide low calorie food for those who wish to control their tendency to be overweight. Various low calorie food products have been prepared and offered for sale. Inasmuch as common sugar is high in calories and its sweetening effect can be obtained with relatively low calorie artificial sweeteners such as saccharin, many products have been offered which are sugar-free, the sweetening effect being obtained with an artificial sweetener. However, in the case of many foods, sucrose cannot be replaced with a low volume, high intensity sweetening agent because the sugar performs other essential functions, such as providing bulk in the food. Accordingly, various low calorie, alginates, gelatins, gum carrageenans and the like have been used to replace the bulk normally provided by sugar. Replacement of sugar with these gums is not always effective because the finished food product is lacking in certain physical properties which are required, such as texture, mouth-feel and appearance. Another method of reducing the caloric content of foods is to reduce the fat content of foods. Fats provide tenderness, texture and satiety value in many food compositions. In baked goods and frostings, the fats readily entrap air during mixing to aid in the leavening process and fluffiness. Unfortunately, fats typically exhibit 9 calories per gram.

The use of polyethylene glycol (PEG) in food compositions to lower the calorie content of the food is known from Ser. Number 883,191 filed on July 8, 1986. However, the PEG used therein was NF (National Formulary) grade which merely limits the combined amount of ethylene glycol and diethylene glycol to not more than 0.25% (2500 parts per million by weight).

The use of highly branched non-caloric polyglucose as a flour substitute in dietetic foods is known from U.S. Pat. Nos. 3,766,165 and 3,876,794.

The purification of PEG by filtration through cation and anion ion exchange resins is known from U.S. Pat. No. 4,650,909. However, this process does not remove the PEG oligomers.

SUMMARY OF THE INVENTION

The present invention is directed to a high purity polyether polyol composition made from alkylene oxides of two to four carbons and active hydrogen compound initiators, said polyol composition having a weight average molecular weight range from about 400 to about 100,000 and having as the major impurity a mixture comprising low molecular weight and high molecular weight oligomers of said initiators with said alkylene oxides wherein said low molecular weight oligomer portion from dimer to pentamer is less than about 10 parts per million for each oligomer and preferably less than about 1 part per million for each oligomer. A preferred aspect of this invention is the high purity polyether polyol composition made from alkylene oxides of two to four carbons and active hydrogen compound initiators, said polyol composition having a weight average molecular weight range from about 600 to about 8,000 and having as the major impurity a mixture comprising low molecular weight and high molecular weight oligomers of said initiators with said alkylene oxides wherein said low molecular weight oligomer portion from dimer to decamer is less than 10 parts per million with less than about 1 part per million being preferred.

A further aspect of the invention is a process for making the high purity polyether polyol compositions which comprises the steps of adding at least 2 grams of water per gram of an impure polyol containing residual amounts of said initiators, alkylene oxide monomers and low and high oligomers, and subjecting the dilute impure polyol to membrane filtration to remove said low molecular weight oligomer portion, initiators, alkylene oxide monomers and alkylene oxide dimers such as dioxane with the permeate.

DETAILED DESCRIPTION OF THE INVENTION

The polyether polyol compositions of this invention comprise polyether polyols having a very small amount of monomers such as alkylene oxides, dimers such as dioxane, and oligomers based on alkylene oxides. An alternate expression in the literature and/or patents for a polyether polyol is a polyalkylene oxide polymer. Typically, the various polyether polyols are prepared by polymerizing various alkylene oxides onto various initiators containing active hydrogens. The reaction is carried out in the presence of either an acidic or basic catalyst, for example, sodium hydroxide. These polyether polyols are well known and commercially available. A further discussion of the reaction to prepare the polyether polyols of this invention can be found in "Polyurethanes, Chemistry and Technology" by J. H. Saunders and K. C. Frish, John Wiley & Sons, N.Y., pgs 33-37; "Glycols" by G. O. Curme, Jr., and F. Johnston, Reinhold, N.Y. (1952) and "Encyclopedia of Chemical Technology" (3rd Edition), vol 8:633-645 and in U.S. Pat. No. 3,370,056. These references are incorporated by reference herein. Examples of alkylene oxides include ethylene oxide, propylene oxide and butylene oxide, preferably ethylene oxide. Copolymers of the alkylene oxides are also included.

Examples of suitable initiators for preparing the polyether polyols include water, ethylene glycols, propylene glycols, butylene glycols, glycerine, pentaerythritol, sucrose, sorbitol, fructose, mannitol, glucose, cellulose, numerous multifunctional alcohols, the amines, and any compound containing a functionality which can contain at least one active hydrogen. Particularly preferred initiators are diethylene glycol, glycerine, sucrose and water. See, for example, the monahls and polyahls disclosed in U.S. Pat. No. 4,477,603.

Equivalent weights of the polyether polyols useful in this invention can vary. Typically, the weights are such that at 20° C. a solid polymer results, and preferably are such that the polymer is large enough to be substantially non-absorbable, or non-digestible. Typically, such weights are greater than about 600, preferably between about 1,000 and about 100,000, and more preferably between about 1,000 and about 10,000. It is understood that polyether polyols having molecular weights up to several million can be useful in some instances. When functioning as a bulk-filling agent, such polyether polyols are most preferably employed in a powder or crystalline form. The melting point of the polyether polyol is typically lower for the lower molecular weight polyether polyols. When functioning as a texturizing fat-replacer, it can be advantageous to employ a polyether polyol which is a solid at 20° C., but which exhibits a melting point of about 37° C. Polyether polyols which are substantially non-thickening when combined with water and provide substantially no laxative effect to humans are particularly preferred. Examples of preferred polyether polyols include polyethylene oxides, such as polyethylene glycol (i.e., PEG); and mixtures of polyethylene oxides and polypropylene oxides i.e. EO/PO copolymers.

The manner of mixing the components is not particularly critical. For example, the components can be dry blended. The amount of polyether polyol composition employed in preparing food compositions according to this invention is a texturizing amount. Such an amount is sufficient to provide the texture, and/or volume and preferably the mouth-feel, which the food composition would exhibit if prepared with sugar and/or fat. Typically, the polyether polyol composition can be substituted for the sugar and/or fat on an equal weight basis. For example, one gram of polyether polyol composition can replace about one gram of sugar and/or fat. When employing the polyether polyol composition along with the low calorie sugar substitute as a mixture, the mixture is employed in an amount sufficient to provide substantially similar sweetness and texture which the food composition would exhibit if prepared with sugar and/or fat.

Food ingredients which are employed along with the polyether polyol composition of this invention include the normal flavorings, flours, fiber sources, and the like. Of course, the particular ingredients will vary according to the particular food composition to be prepared. For example, the ingredients employed in preparing a cake may be different from those employed in making a candy. A low calorie, substantially sugarless or fat-free baked goods food composition can be prepared by employing a texturizing amount of the polyalkylene oxide polymeric composition. The polyalkylene oxide polymeric composition can replace a large amount of the sugar and function as an emulsifier so that an amount of the shortening and eggs can be reduced. Typically, baked goods are prepared from batter compositions comprising a flour, a shortening, an emulsifier, leavening agents and moisturizing agents. Flours which can be employed in practicing this invention include whole wheat, soft wheat, all purpose and enriched flours. Shortenings which can be employed in practicing this invention include coconut oil, palm kernel oil, cottonseed oil, peanut oil, olive oil, sunflower seed oil, sesame oil, corn oil, safflower oil, poppyseed oil and soybean oil. Leavening agents which can be employed include edible carbon dioxide-producing salts such as carbonate and bicarbonate salts (i.e., sodium carbonate, sodium bicarbonate, potassium carbonate and potassium bicarbonate). Moisturizing agents include milk and water.

The polyether polyols of this invention are purified by the use of membrane filtration and/or diafiltration and/or ultrafiltration. The techniques of ultrafiltration are well known from the Encyclopedia of Chemical Technology, Third Ed., vol 23:439–461 which is incorporated by reference herein. Membrane separation processes have been reviewed by L. E. Applegate in Chemical Engineering; June 11, 1984; pgs 64–89 which is also incorporated by reference herein. The manufacture of special membranes and their uses are known from U.S. Pat. Nos. 4,048,271; 4,240,914; 4,332,680; 4,384,047 and 4,618,534. These patents are also incorporated by reference herein. The membranes used herein have a molecular weight cut off of at least 150 daltons.

GENERAL PROCEDURE

The polyethylene glycols (PEG) used in this study were commercial grades of PEG. The apparatus used in the diafiltration experiments was as follows. A membrane of the type to be used was installed in a horizontal membrane frame. The membrane surface area was 0.25 square feet. A feed pump was used to supply impure PEG from a feed tank to the upper part of the membrane frame. Permeate containing the impurities and/or lower molecular weight oligomers was removed from the lower part of the membrane frame. The concentrate flowed from the membrane frame to a recycle cooler. The feed pump temperature was used as the control temperature with heat added at the feed tank and taken out in the recycle cooler. A needle valve in the concentrate line between the membrane frame and the recycle cooler was used to maintain a constant pressure on the membrane. A constant liquid level and polyethylene glycol concentration in the feed was maintained by adding deionized water (DI water) back to the system as permeate is removed. The concentrations of the homologs of ethylene glycol through decaethylene glycol were determined in the final product using high performance liquid chromatography (hereinafter HPLC).

EXAMPLE 1

A FilmTec TM NF-20 membrane was installed in the membrane frame. A 1000 gram aqueous solution containing 4.0% by weight solution of Dow polyglycol E-1450 N.F. was placed in the feed tank. Feed flow was established and the pressure on the membrane was set at 100 pounds per square inch gage (psig). Table I lists the operating data for this run.

TABLE I

| Run Time (min.) | Feed Temp. °F. | Permeate (ml) | DI Water Added (ml) |
|---|---|---|---|
| 107 | 76 | 600 | 600 |
| 221 | 79 | 600 | 600 |
| 326 | 82 | 600 | 600 |
| 425 | 86 | 700 | none |
| | Total | 2,500 | 1,800 |

After 425 minutes of operation the concentrate was drained from the system. Water was removed and/or extracted from the concentrate sample on a rotary evaporator. The concentrate was analyzed for the homologs of polyethylene glycol through decaethylene glycol using HPLC. Table II lists the analysis of the polyethylene glycol before and after treatment. The concentrate numbers given are an average of two analyses.

TABLE II

| Component | Starting PEG (ppm) | Concentrate (ppm) |
|---|---|---|
| Ethylene glycol | 9 | * |
| Diethylene glycol | 14 | * |
| Triethylene glycol | 20 | * |
| Tetraethylene glycol | 34 | * |
| Pentaethylene glycol | 22 | * |
| Hexaethylene glycol | 38 | 10 |
| Heptaethylene glycol | 45 | 20 |
| Octaethylene glycol | 53 | 27 |
| Nonaethylene glycol | 60 | 35 |
| Decaethylene glycol | 62 | 38 |

TABLE II-continued

| Component | Starting PEG (ppm) | Concentrate (ppm) |
|---|---|---|
| Total | 357 | 130 |

Note:
* = less than 1 part per million (weight basis) and this symbol is used in all the tables herein.

EXAMPLE 2

Following the procedure of Example I using a PEG with a higher molecular weight (E-3350), the results set forth in Table III were obtained.

TABLE III

| Component | Starting PEG (ppm) | Concentrate (ppm) |
|---|---|---|
| Ethylene glycol | * | * |
| Diethylene glycol | 1 | * |
| Triethylene glycol | 2 | * |
| Tetraethylene glycol | 5 | * |
| Pentaethylene glycol | 8 | 5 |
| Hexaethylene glycol | 8 | 6 |
| Heptaethylene glycol | 9 | 5 |
| Octaethylene glycol | 22 | 23 |
| Nonaethylene glycol | 21 | 16 |
| Decaethylene glycol | 18 | 20 |
| Total | 95 | 74 |

EXAMPLE 3

Following the procedure of Example 1 using a 10% by weight PEG solution instead of 4%, the results set forth in Table IV were obtained.

TABLE IV

| Component | Starting PEG (ppm) | Concentrate (ppm) |
|---|---|---|
| Ethylene glycol | 14 | * |
| Diethylene glycol | 12 | * |
| Triethylene glycol | 16 | * |
| Tetraethylene glycol | 21 | * |
| Pentaethylene glycol | 21 | * |
| Hexaethylene glycol | 22 | 5 |
| Heptaethylene glycol | 46 | 22 |
| Octaethylene glycol | 94 | 33 |
| Nonaethylene glycol | 212 | 37 |
| Decaethylene glycol | 167 | 35 |
| Total | 625 | 132 |

EXAMPLE 4

Following the procedure of Example 1 using a 7 weight percent PEG 1450 aqueous solution with a NF-20-2540 spiral membrane (25 square feet in surface area, 2.5 inches in diameter, 40 inches long), the data set forth in Tables V and VI were obtained.

TABLE V

| Run Time (hours) | Feed Temperature (°F.) | Permeate (gallons) |
|---|---|---|
| 2 | 88 | 34 |
| 20 | 86 | 304 |
| 30 | 91 | 166 |
| 40 | 81 | 158 |
| 73.5 | 81 | 544 |
| Total | | 1,206 |

TABLE VI

| Component | Starting PEG (ppm) | Concentrate (ppm) |
|---|---|---|
| Monoethylene glycol | 6 | * |
| Diethylene glycol | 8 | * |
| Triethylene glycol | 15 | * |
| Tetraethylene glycol | 19 | * |
| Pentaethylene glycol | 15 | * |
| Hexaethylene glycol | 39 | * |
| Heptaethylene glycol | 58 | * |
| Octaethylene glycol | 70 | * |
| Nonaethylene glycol | 120 | * |
| Decaethylene glycol | 130 | * |
| Total | 480 | 0 |

EXAMPLE 5

A cellulose acetate membrane (Osmonic ™ SEPA SX01) was installed in the membrane frame. A 4.0 wt% solution (1000 g) of PEG E-1450 was placed in the feed tank. The feed flow was started and the pressure on the membrane was set at 100 psi. Add deionized water in 200 ml increments to a total of 2000 ml to the feed tank to replace the volume lost as permeate. After a run time of 250 minutes, the water addition was stopped. Table VII lists the operating data for this run.

TABLE VII

| Run Time (min.) | Feed Temp. (°F.) | Permeate (ml) |
|---|---|---|
| 81 | 85 | 600 |
| 167 | 89 | 600 |
| 250 | 90 | 600 |
| 310 | 91 | 500 |
| Total | | 2,300 |

The concentrate was drained from the membrane rig. The water was removed from the concentrate on a rotary evaporator. Table VIII lists the concentration of the homologs of polyethylene glycol up to decaethylene glycol as determined by HPLC.

TABLE VIII

| Component | Starting PEG (ppm) | Concentrate (ppm) |
|---|---|---|
| Monoethylene glycol | 9 | * |
| Diethylene glycol | 14 | * |
| Triethylene glycol | 20 | * |
| Tetraethylene glycol | 34 | * |
| Pentaethylene glycol | 22 | * |
| Hexaethylene glycol | 38 | 8 |
| Heptaethylene glycol | 45 | 17 |
| Octaethylene glycol | 53 | 35 |
| Nonaethylene glycol | 60 | 36 |
| Decaethylene glycol | 62 | 40 |
| Total | 357 | 136 |

CONTROLS 1-3

In order to illustrate the improvement in purity set forth above, three samples of relatively pure PEG (Kodak Fusogen Grade, Polysciences Pharmaceutical Grade and Polysciences E-1450 Grade) were obtained and analyzed by HPLC. The results are set forth in Table IX.

TABLE IX

| Component | Control 1 Kodak Fusogen Grade (ppm)# | Control 2 Polysciences Pharmaceutical Grade (ppm)# | Control 3 Polysciences E-1450 Grade (ppm)# |
|---|---|---|---|
| Monoethylene glycol | 16 | 21 | 39 |
| Diethylene glycol | 10 | 18 | 28 |
| Triethylene glycol | 12 | 24 | 31 |
| Tetraethylene glycol | 21 | 35 | 45 |
| Pentaethylene glycol | 17 | 31 | 31 |
| Hexaethylene glycol | 33 | 37 | 50 |
| Heptaethylene glycol | 34 | 68 | 52 |
| Octaethylene glycol | 58 | 66 | 74 |
| Nonaethylene glycol | 63 | 65 | 55 |
| Decaethylene glycol | 84 | 78 | 99 |

# = the values given are an average of two samples

Control 4

A FilmTec TM NF-40 membrane was installed in the membrane frame. A 4 wt% solution of PEG (1000 g) was placed in the feed tank. Established feed flow and set the pressure on the membrane at 100 psi. Add deionized water in 200 ml increments to a total of 2000 ml to the feed tank to replace the volume lost as permeate. After a run time of 269 minutes, the water addition was stopped. Table X lists the operating data for this run.

TABLE X

| Run Time (min.) | Feed Temp. °F. | Permeate (ml) |
|---|---|---|
| 94 | 90 | 600 |
| 190 | 94 | 748 |
| 269 | 96 | 660 |
| 345 | 96 | 590 |
| | Total | 2,598 |

Removed 423.4 g of concentrate from the membrane rig. The water from the concentrate was removed on a rotary evaporator. The 31.2 g of the purified PEG recovered represents 78% recovery of the starting polyethylene glycol in the concentrate. Table XI lists the concentration of the homologs of polyethylene glycol up to decaethylene glycol as determined by HPLC. The concentration numbers given are an average of two analyses.

TABLE XI

| Component | Starting material (ppm) | Concentrate (ppm) |
|---|---|---|
| Monoethylene glycol | 9 | * |
| Diethylene glycol | 14 | * |
| Triethylene glycol | 20 | * |
| Tetraethylene glycol | 34 | 10 |
| Pentaethylene glycol | 22 | 8 |
| Hexaethylene glycol | 38 | 11 |
| Heptaethylene glycol | 45 | 16 |
| Octaethylene glycol | 53 | 23 |
| Nonaethylene glycol | 60 | 33 |
| Decaethylene glycol | 62 | 37 |
| Total | 357 | 138 |

Control 5

Following the procedure of Control 4 using a larger volume of permeate, the results set forth in Tables XII and XIII were obtained.

TABLE XII

| Run Time (min.) | Feed Temp. (°F.) | Permeate (ml) |
|---|---|---|
| 36 | 84 | 600 |
| 67 | 86 | 600 |
| 97 | 90 | 660 |
| 122 | 87 | 500 |
| | Total | 2,360 |

TABLE XIII

| Component | Starting PEG (ppm) | Concentrate (ppm) |
|---|---|---|
| Monoethylene glycol | 9 | * |
| Diethylene glycol | 14 | * |
| Triethylene glycol | 20 | 7 |
| Tetraethylene glycol | 34 | 12 |
| Pentaethylene glycol | 22 | 11 |
| Hexaethylene glycol | 38 | 16 |
| Heptaethylene glycol | 45 | 26 |
| Octaethylene glycol | 53 | 36 |
| Nonaethylene glycol | 60 | 45 |
| Decaethylene glycol | 62 | 47 |
| Total | 357 | 200 |

What is claimed is:

1. A high purity polyalkylene polyol composition having a weight average molecular weight range from about 400 to about 15,000 and having as the major impurity a mixture comprising low molecular weight and high molecular weight polyalkylene polyol oligomers wherein said low molecular weight oligomer portion from dimer to pentamer is less than about 10 parts per million for each oligomer.

2. A high purity composition as set forth in claim 1 wherein the weight average molecular weight range is from about 600 to about 8,000.

3. A high purity composition as set forth in claim 1 wherein the weight average molecular weight range is from about 800 to about 4,000.

4. A high purity composition as set forth in claim 1 wherein said low molecular weight oligomer portion from dimer to decamer is less than about 10 part per million.

5. A high purity composition as set forth in claim 1 wherein said low molecular weight oligomer portion from dimer to pentamer is less than about 1 part per million.

6. A high purity composition as set forth in claim 1 wherein said low molecular weight oligomer portion from dimer to decamer is less than about 1 part per million.

7. A high purity polyether polyol composition made from alkylene oxides of two to four carbons and active hydrogen compound initiators, said polyol composition having a weight average molecular weight range from about 400 to about 100,000 and having as the major impurity a mixture comprising low molecular weight and high molecular weight oligomers of said initiators with said alkylene oxides wherein said low molecular weight oligomer portion from dimer to pentamer is less than about 10 parts per million for each oligomer.

8. A high purity polyalkylene glycol composition as set forth in claim 7 having a weight average molecular weight range from about 600 to about 8,000.

9. A high purity polyalkylene glycol composition as set forth in claim 7 having a weight average molecular weight range from about 800 to about 4,000.

10. A high purity composition as set forth in claim 5 wherein said low molecular weight oligomer portion from dimer to decamer is less than 10 parts per million.

11. A high purity composition as set forth in claim 7 wherein said low molecular weight oligomer portion from dimer to pentamer is less than about 1 part per million.

12. A high purity composition as set forth in claim 7 wherein said low molecular weight oligomer portion from dimer to decamer is less than about 1 part per million.

13. A high purity polyethylene glycol composition having a weight average molecular weight range from about 400 to about 15,000 and having as the major impurity a mixture comprising low molecular weight and high molecular weight polyethylene glycol oligomers wherein said low molecular weight oligomer portion from dimer to pentamer is less than about 10 parts per million for each oligomer.

14. A high purity polyethylene glycol composition as set forth in claim 13 wherein the weight average molecular weight range is from about 600 to about 8,000.

15. A high purity polyethylene glycol composition as set forth in claim 13 wherein the weight average molecular weight range is from about 800 to about 4,000.

16. A high purity composition as set forth in claim 13 wherein said low molecular weight oligomer portion from dimer to decamer is less than about 1 part per million.

17. A high purity composition as set forth in claim 13 wherein said low molecular weight oligomer portion from dimer to pentamer is less than about 1 part per million.

18. A high purity composition as set forth in claim 1 wherein said low molecular weight oligomer portion from dimer to decamer is less than about 1 part per million.

19. A high purity polyether polyol composition made from alkylene oxides of two to four carbons and active hydrogen compound initiators, having a weight average molecular weight range from about 400 to about 100,000 and having as the major impurity a mixture comprising low molecular weight and high molecular weight oligomers of said initiators with said alkylene oxides wherein said high purity composition is produced by the process comprising the steps of
   (i) adding at least 2 grams of water per gram of an impure polyol containing residual amounts of said initiators, alkylene oxide monomers and low and high oligomers, and
   (ii) subjecting the dilute impure polyol to membrane filtration to remove said low molecular weight oligomer portion, initiators, and alkylene oxide monomers with the permeate.

20. A high purity polyether polyol composition as set forth in claim 19 wherein the membrane used has a molecular weight cut off of at least 150 daltons.

21. A high purity polyethylene glycol composition made from ethylene oxide and active hydrogen compound initiators, having a weight average molecular weight range from about 400 to about 15,000 and having as the major impurity a mixture comprising low molecular weight and high molecular weight oligomers of said initiators with said ethylene oxide wherein said high purity composition is produced by the process comprising the steps of
   (i) adding at least 2 grams of water per gram of an impure glycol containing residual amounts of said initiators, ethylene oxide and low and high oligomers, and
   (ii) subjecting the dilute impure polyol to membrane filtration to remove said low molecular weight oligomer portion, initiators, and ethylene oxide with the permeate.

22. A high purity polyethylene glycol composition as set forth in claim 21 wherein the membrane used has a molecular weight cut off of at least 150 daltons.

23. A process for making high purity polyether polyol compositions wherein said high purity composition is produced by the process comprising the steps of
   (i) adding at least 2 grams of water per gram of an impure polyol made from alkylene oxides of two to four carbons and active hydrogen compound initiators and having a weight average molecular weight range from about 400 to about 100,000 containing residual amounts of said initiators, alkylene oxide monomers and low and high oligomers, and
   (ii) subjecting the dilute impure polyol to membrane filtration to remove said low molecular weight oligomer portion, initiators, and alkylene oxide monomers with the permeate.

24. A process as set forth in claim 23 wherein the membrane used has a molecular weight cut off of at least 150 daltons.

25. A process for making high purity polyethylene glycol compositions wherein said high purity composition is produced by the process comprising the steps of
   (i) adding at least 2 grams of water per gram of an impure polyethylene glycol made from alkylene oxides of two to four carbons and active hydrogen compound initiators and having a weight average molecular weight range from about 400 to about 100,000 containing residual amounts of said initiators, alkylene oxide monomers and low and high oligomers, and
   (ii) subjecting the dilute impure polyethylene glycol to membrane filtration to remove said low molecular weight oligomer portion, initiators, and alkylene oxide monomers with the permeate.

26. A process as set forth in claim 25 wherein the membrane used has a molecular weight cut off of at least 150 daltons.

* * * * *